United States Patent
Yazaki et al.

(10) Patent No.: US 6,259,696 B1
(45) Date of Patent: Jul. 10, 2001

(54) ATM SWITCH AND CONGESTION CONTROL METHOD

(75) Inventors: Takeki Yazaki, Ebina; Takeshi Aimoto, Sagamihara, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/985,142

(22) Filed: Dec. 4, 1997

(30) Foreign Application Priority Data

Dec. 5, 1996 (JP) .................................... 8-325066

(51) Int. Cl.[7] ...................................... H04J 3/16
(52) U.S. Cl. ................. 370/395; 370/229; 370/230; 370/235
(58) Field of Search ................... 370/229, 230, 370/231, 235, 237, 253, 389, 392, 395, 400, 412, 413, 429, 463, 537

(56) References Cited

U.S. PATENT DOCUMENTS

| | | | |
|---|---|---|---|
| 5,090,011 | * 2/1992 | Fukuta et al. | 370/229 |
| 5,309,431 | * 5/1994 | Tominaga et al. | 370/230 |
| 5,729,530 | * 3/1998 | Kawaguchi et al. | 370/236 |
| 5,793,748 | * 8/1998 | Murase | 370/235 |

FOREIGN PATENT DOCUMENTS 689318   12/1995   (EP) .
730390 * 4/1996   (EP) .

OTHER PUBLICATIONS

"ATM traffic management and the impact of ATM switch design" by David M. Drury–Computer Networks and ISDN System, vol. 28, No. 4.

International Application published under PCT, No.:WO 96/29806 dated Sep. 26, 1996.

* cited by examiner

Primary Examiner—Wellington Chin
Assistant Examiner—Frank Duong
(74) Attorney, Agent, or Firm—Sofer & Haroun, LLP (57) ABSTRACT

An ATM switch having a packet level discard function includes an upstream congestion detection circuit for detecting a congestion state of an ATM switch provided in the upstream and a packet level discard control table for holding at every connection a packet level discard priority indicating whether the ATM switch provided in the upstream has the packet level discard function or not, and wherein cells transmitted via an ATM switch not having a packet level discard function or an ATM switch which is not in the congestion state are packet-level-discarded with a priority to other cells. Thus, it is possible to improve a goodput of the ATM network in which ATM switches having a packet level discard function and ATM switches not having a packet level discard function are provided in a mixed state.

7 Claims, 7 Drawing Sheets

PACKET LEVEL DISCARD CONTROL TABLE 129

| CONNECTION ENTRY NUMBER | PACKET LEVEL DISCARD OCCURRENCE INFORMATION | PACKET FIRST CELL INFORMATION | PACKET LEVEL DISCARD PRIORITY |
|---|---|---|---|
| CONNECTION ENTRY NUMBER (CONNECTION 21) | 701-21 | 702-21 | 703-21 |
| CONNECTION ENTRY NUMBER (CONNECTION 22) | 701-22 | 702-22 | 703-22 |
| CONNECTION ENTRY NUMBER (CONNECTION 23) | 701-23 | 702-23 | 703-23 |
| CONNECTION ENTRY NUMBER (CONNECTION 24) | 701-24 | 702-24 | 703-24 |

FIG.9

ATM SWITCH AND CONGESTION CONTROL METHOD

BACKGROUND OF THE INVENTION

1. Field of the Invention

The present invention relates to an asynchronous transfer mode (ATM) switch and a congestion control method in an asynchronous transfer mode, and particularly to an ATM switch capable of packet level discard.

2. Description of the Related Art

Heretofore, as a cell transmission method of an ATM network comprising an ATM switch using an asynchronous transfer mode (hereinafter simply referred to as "ATM"), there are standardized the following four kinds of traffic classes. That is, a CBR (Constant Bit Rate) and a VBR (Variable Bit Rate) are standardized as a traffic class of a bandwidth-reserved type in which a bandwidth is reserved when a call is set between a network and an end system. An ABR (Available Bit Rate) and a UBR (Unspecified Bit Rate) are standardized as a traffic class in which a bandwidth cannot be reserved when a call is set because a traffic occurs in a burst fashion like a LAN (local Area Network) traffic. In the ABR and UBR traffic classes, the ATM network hardly guarantees a quality of service, and hence the ABR and UBR traffic classes are called "Best Effort type" traffic classes.

In the bandwidth-reserved type traffic classes, a surveillance mechanism called a UPC (Usage Parameter Control) provided at the entrance of the source end system side of a user network interface detects whether or not data is transmitted at a rate under a previously-reserved bandwidth. If it is determined by the UPC that there is a non-conforming cell, then such non-conforming cell is discarded or a discard priority is set to be high one more time, and data is transferred to the next ATM switch. Accordingly, it is possible to prevent a network congestion from being caused by a traffic from the source end system.

On the other hand, in the Best Effort type traffic class, the bandwidth is not reserved, and hence the above-mentioned UPC cannot be applied thereto. Further, a traffic occurs in a burst fashion, and a traffic which exceeds an available rate of an ATM switch provided within the network tends to be received, thereby resulting in a congestion. There is then a large possibility that a cell will be discarded. The ATM switch includes an internal cell buffer to temporarily accumulate cells when a congestion state is a slight congestion state, thereby preventing a cell from being discarded. However, if an excess traffic concentration is continued so that a congestion state becomes serious and accumulated cells exceed a storage capacity of the cell buffer in the ATM switch, then a cell discard will occur.

As a method of preventing a transmission efficiency of an ATM network from being lowered by minimizing a cell discard influence exerted by a congestion, there is known a method (packet level discard) which discards cells at the packet level. JP-A-6-334681 ("CELL SWITCH SYSTEM AND APPARATUS"), for example, discloses a packet level discard. Although a cell discard occurs in the ATM switch which has fallen into the congestion state, a destination end system cannot rearrange a packet if any one of cells composing the same packet is missing. Therefore, when a cell discard occurs over a number of packets, a number of packets are transmitted again from the source end system to the destination end system, resulting in a throughput of packet level (goodput) being lowered unnecessarily. The packet level discard function is able to discard cells composing the same packet continuously transmitted from the connection up to the interval of packets when the ATM switch, which has fallen into the congestion state, executes a cell discard. Owing to the packet level discard, the cell discard is concentrated on lesser packets so that an invalid packet in which any one of cells is missing can be prevented from being transmitted. Therefore, it becomes possible to improve a goodput of an ATM network.

SUMMARY OF THE INVENTION

The above-mentioned packet level discard has hitherto been proposed as a method of preventing the goodput of the ATM network from being lowered by suppressing an influence of a congestion unavoidably caused in the Best Effort type traffic class to the minimum. However, as shown in FIG. 2, when a plurality of ATM switches not having the packet level discard function exist in the upstream of the connection of other ATM switches having a packet level discard function (case 1), there arise the following problems.

Figure 2:
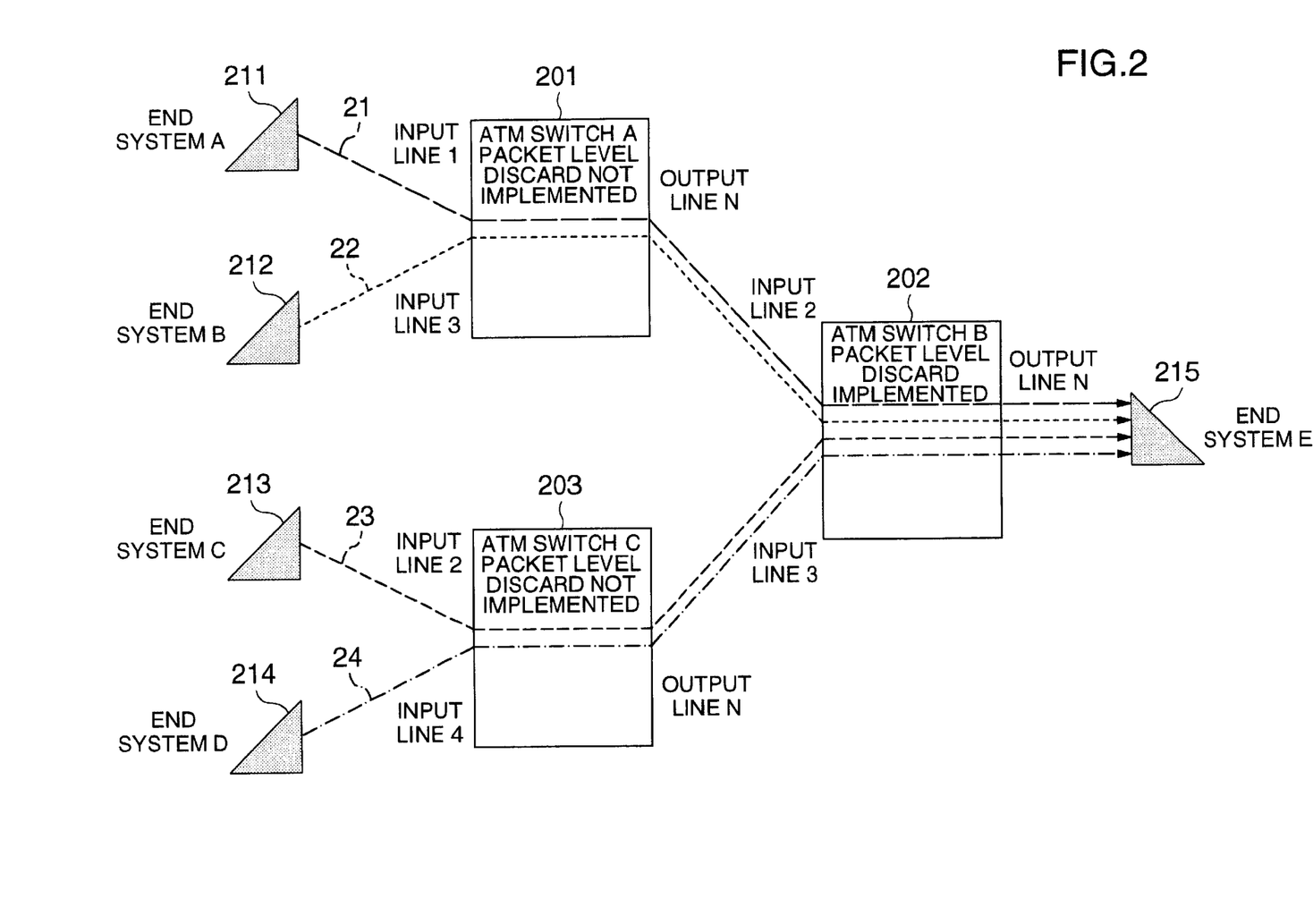
FIG. 2 is a diagram showing an embodiment of an ATM network to which the present invention is effectively applicable.

As shown in FIG. 2, an ATM network comprises ATM switches A 201 and C 203 not having a packet level discard function, an ATM switch B 202 with a packet level discard function, an end system A 211, an end system B 212, an end system C 213, an end system D 214 and an end system E 215. A cell flows from the end system A 211 to the end system E 215, a cell flows from the end system B 212 to the end system E 215, a cell flows from the end system C 213 to the end system E 215, and a cell flows from the end system D 214 to the end system E 215, respectively. Let us now consider the case in which a congestion occurs in the ATM switch A 201 and no congestion occurs in the ATM switch C 203. There is a large possibility that a packet transmitted from the ATM switch A 201 to the ATM switch B 202 will be an imperfect packet having a missing cell (hereinafter referred to as "cell-missing-packet"). On the other hand, there is a large possibility that a packet transmitted from the ATM switch C 203 to the ATM switch B 202 will be a packet of which the cell is not missing (hereinafter referred to as "perfect packet"). However, when the ATM switch B 202 is placed in the congestion state, there is then a large possibility that, in order to equivalently packet-level-discard the packet sent from the ATM switch A 201 and the packet sent from the ATM switch C 203, the ATM switch B 202 will transmit the cell-missing-packet sent from the ATM switch A 201 to the end system E 215 but instead the ATM switch B 202 will packet-level-discard the perfect packet from the ATM switch C 203. In this case, since both of the cell-missing packet and the perfect packet are transmitted again, the bandwidth between the ATM switch B 202 and the end system E 215 is utilized uselessly, resulting in the goodput of the ATM network being lowered.

Figure 3:
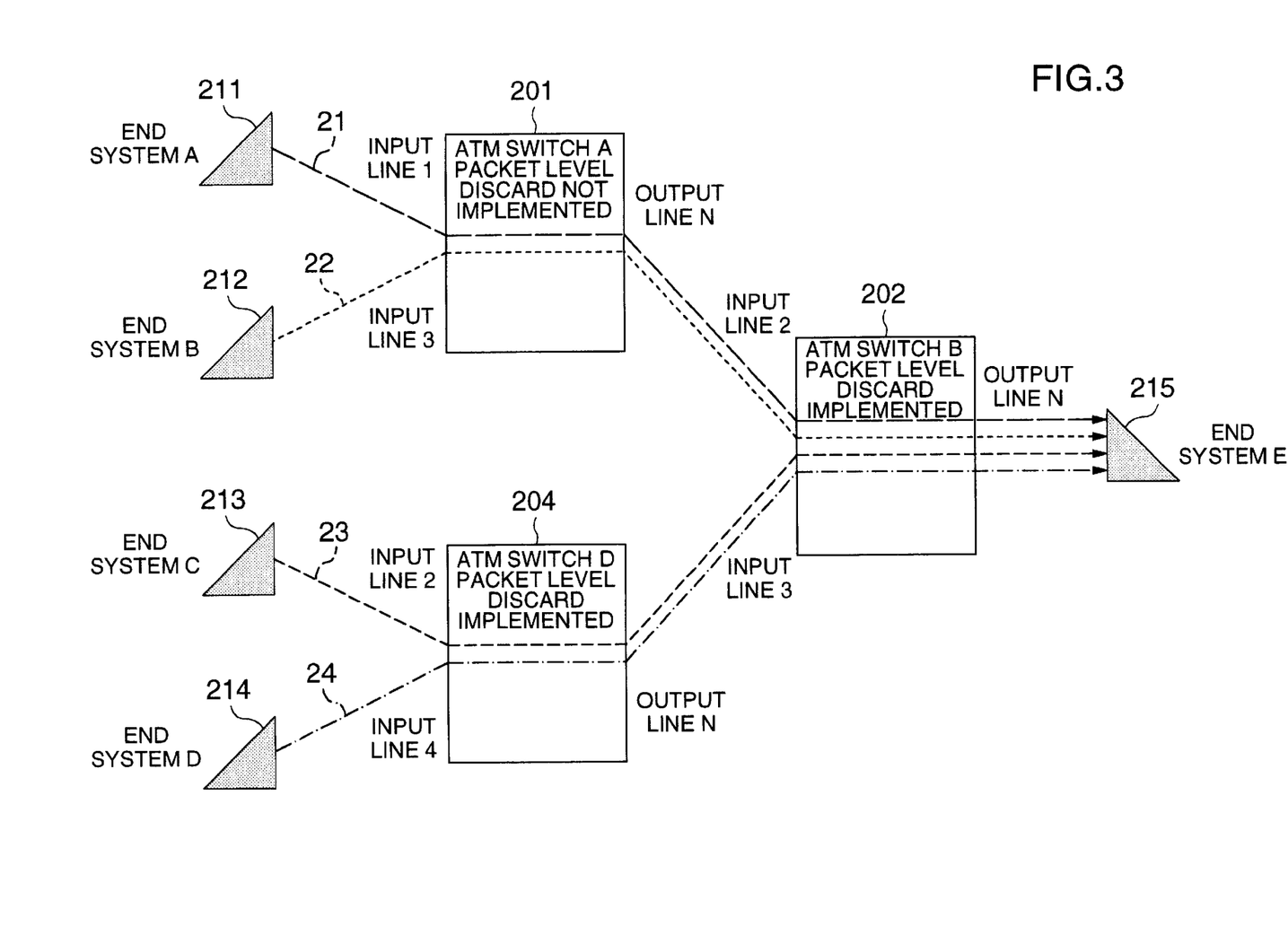
FIG. 3 is a diagram showing another embodiment of an ATM network to which the present invention is effectively applicable.

Further, as shown in FIG. 3, when the ATM switch with the packet level discard function implemented and the ATM switch not having the packet level discard function exist in the upstream of the connection of the other ATM switch having the packet level discard function (case 2), there arises a similar problem.

As shown in FIG. 3, in the ATM network, the ATM switch C 203 not having the packet level discard function in FIG. 2 is replaced having an ATM switch D 204 with a packet level discard function. Similarly to FIG. 2, as shown in FIG. 3, a cell flows from the end system A 211 to the end system E 215, a cell flows from the end system B 212 to the end system E 215, a cell flows from the end system C 213 to the end system E 215, and a cell flows from the end system D 214 to the end system E 215, respectively. When a congestion occurs in the ATM switch A 201, there is then a large possibility that a packet transmitted from the ATM switch A 201 to the ATM switch B 202 will be a cell-missing-packet. On the other hand, a packet transmitted from the ATM switch D 204 to the ATM switch B 202 is a perfect packet. However, when the ATM switch B 202 is placed in the congestion state, the ATM switch B 202 equivalently packet-level-discards the packet transmitted from the ATM switch A 201 and the packet transmitted from the ATM switch D 204 so that a problem similar to the above-mentioned (case 1) arises.

Figure 8:
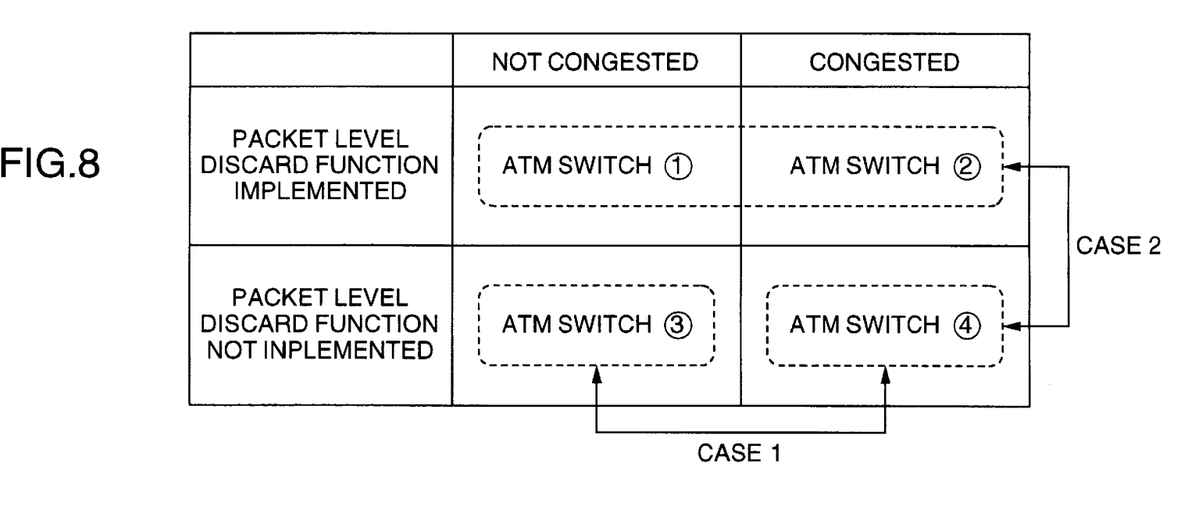
FIG. 8 is a table showing classified results of ATM switches from a standpoint of implementation packet level discard function and the existence of a congestion.

FIG. 8 is a table showing classified results of the ATM switches placed in the upstream of the ATM switch having the packet level discard function from a stand-point of the implementation of packet level discard function and the existence of a congestion. An ATM switch having a packet level discard function and which is not placed in the congestion state is an ATM switch ①; an ATM switch having a packet level discard function and which is placed in the congestion state is an ATM switch ②; an ATM switch not having a packet level discard function and which is not placed in the congestion state is an ATM switch ③; and an ATM switch not having a packet level discard function and which is placed in the congestion state is an ATM switch ④.

In the ATM network in which a plurality of ATM switches ③ and ④ exist in the upstream of the ATM switch having the packet level discard function or in the ATM network in which a plurality of ATM switches ①, ②, ④ exist in the upstream of the ATM switch having the packet level discard function, in order to solve the above-mentioned problem, according to the present invention, the ATM switch having the packet level discard function includes an upstream congestion detection circuit for detecting a congestion state of an ATM switch provided in the upstream with reference to a congestion indication bit of a received cell and a packet level discard control table which memorizes therein a packet level discard priority indicating whether or not the ATM switch not having the packet level discard function exists in the upstream of the connection at every connection. In the case of the case 1 in which the ATM switches ③ and ④ exist in the upstream of the connection, on the basis of a detected result from the upstream congestion detection circuit, a packet having the large possibility that it will be a cell-missing-packet transmitted from the ATM switch ④ is packet-level-discarded with a priority to a perfect packet transmitted from the ATM switch ③. Moreover, in the case of the case 2 in which the ATM switches ①, ②, ④ exist in the upstream of the connection, with reference to the packet level discard priority memorized in the packet level discard control table, a packet having a large possibility that it will be a cell-missing-packet transmitted from the ATM switch ④ is packet-level-discarded with a priority to the perfect packets transmitted from the ATM switches ① and ②.

According to the ATM switch having the packet level discard function of the present invention, it is possible to reduce the number of the cell-missing-packets that are transmitted to the ATM network, thereby making it possible to improve the goodput of the ATM network.

DESCRIPTION OF THE PREFERRED EMBODIMENTS

Embodiments of the present invention will be described with reference to an apparatus including an output FIFO (first-in first-out) buffer. FIG. 2 shows an ATM network according to the embodiment of the present invention (case 1). As shown in FIG. 2, this ATM network comprises the ATM switches A 201 and C 203 not having the packet level discard function, the ATM switch B 202 having the packet level discard function and the end system A 211, the end system B 212, the end system C 213, the end system D 214 and the end system E 215. Four connections 21, 22, 23, 24 are set in this ATM network. Specifically, the connection 21, in which cells are received from the end system A 211 through an input line 1 of the ATM switch A 201 and outputted from an output line N, and further received at an input line 2 of the ATM switch B 202, in which it is switched to the output line N and extended to the end system E 215, is set. The connection 22, in which cells are received from the end system B 212 through an input line 3 of the ATM switch A 201 and outputted from the output line N, and further received at the input line 2 of the ATM switch B 202, in which it is switched to the output line N and extended to the end system E 215, is set. The connection 23, in which cells are received from the end system C 213 through the input line 2 of the ATM switch C 203 and outputted from the output line N, and further received at the input line 3 of the ATM switch B 202, in which it is switched to the output line N and extended to the end system E 215, is set. Further, the connection 24, in which cells are received from the end system D 214 through an input line 4 of the ATM switch C 203 and outputted from the output line N, and further received at the input line 3 of the ATM switch B 202, in which it is switched to the output line N and extended to the end system E 215, is set.

Figure 1:
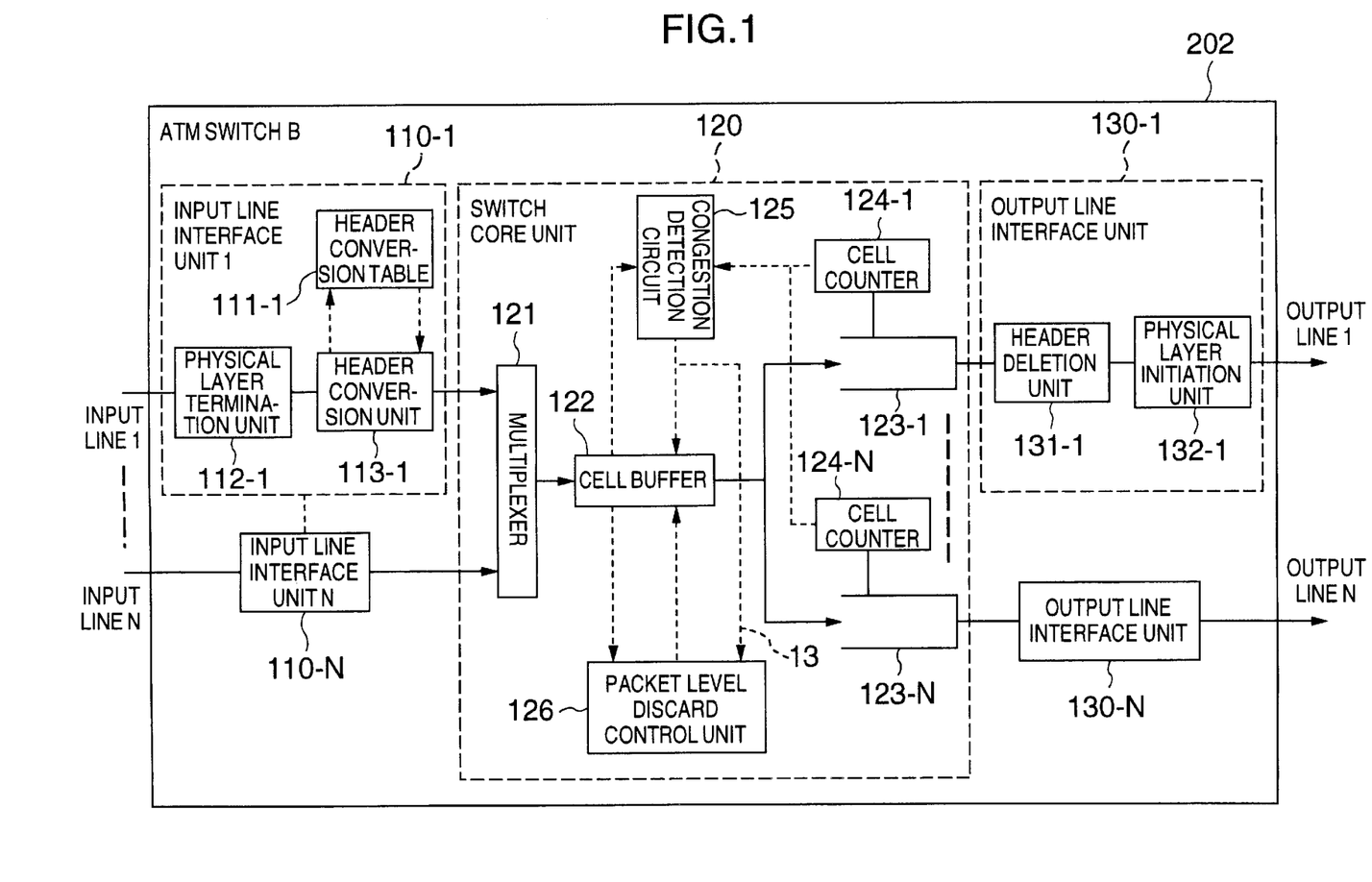
FIG. 1 is a block diagram showing an ATM switch B 202 according to the present invention.

FIG. 1 shows in block form the ATM switch B 202 according to the embodiment of the present invention. As shown in FIG. 1, the ATM switch B 202 comprises N input lines 1 to N, N output lines 1 to N, input line interface units 110-1 to 110-N for effecting a physical layer termination, a header conversion and an addition of switch internal information, output line interface units 130-1 to 130-N for effecting a physical layer initiation and a deletion of switch internal information and a switch core unit 120 for executing a cell switching and a packet level discard or the like.

The input line interface unit 110-i (i=1 to N) comprises a header conversion table 111-i, a physical layer termination unit 112-i and a header conversion unit 113-i.

The output line interface unit 130-i (i=1 to N) comprises a header deletion unit 131-i and a physical layer initiation unit 132-i.

The switch core unit 120 comprises a multiplexer 121 for multiplexing cells inputted from the input lines i (i=1 to N), a cell buffer 122 having a storage capacity of several cells to temporarily accumulate cells, output FIFO buffer memories 123-1 to 123-N provided at every output line to accumulate cells, cell counters 124-i (i=1 to N) for counting the number of cells accumulated in the output FIFO buffer memories 123-i (i=1 to N) of the output lines i, a packet level discard control unit 126 for judging the execution of the packet level discard, and a congestion detection circuit 125 having a function to compare values of the cell counters 124-i and a congestion judgment threshold value T1 thereby to make a congestion indication bit of a cell within the cell buffer 122 ON based on a compared result and a function to compare threshold values T3, T4 and the values of the cell counters 124-i thereby to report a compared result to the packet level discard control unit 126.

Figure 4:
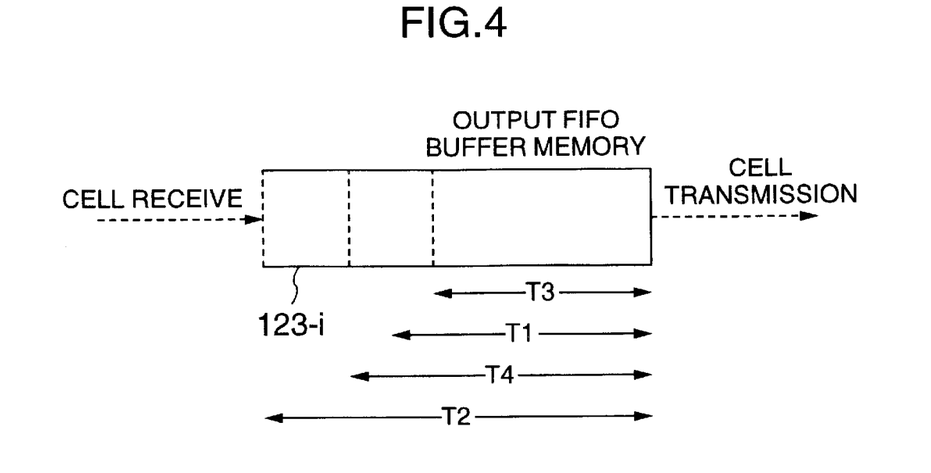
FIG. 4 is a diagram used to explain threshold values T1, T2, T3, T4 within a congestion detection circuit 125.

The congestion detection circuit 125 has four threshold values T1, T2, T3, T4 shown in FIG. 4. The threshold value T1 is a congestion judgment threshold value; the threshold value T2 is a maximum cell number of cells that can be accumulated in the output FIFO buffer memories 123-i; and the threshold values T3, T4 are the threshold values that are used to judge the congestion as a slight congestion or a serious congestion. A relationship of T2>T4>T3 is satisfied among the respective threshold values T2, T3, T4. Although the threshold value T1 falls within a relationship of T2>T4>T1>T3 as shown in FIG. 4, the threshold value T1 may take any values so long as a relationship of T2>T1 is satisfied.

Figure 5:
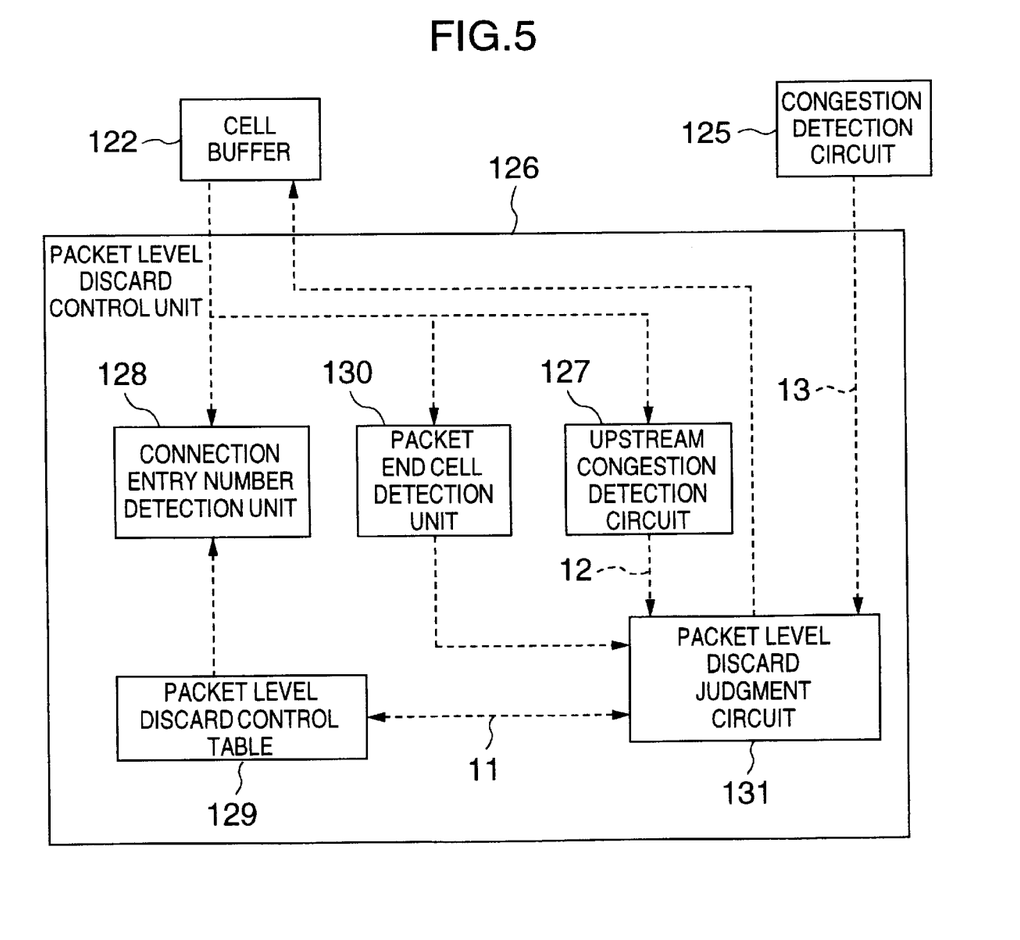
FIG. 5 is a block diagram showing a packet level discard control unit 126 more in detail.

FIG. 5 shows in block form the packet level discard control unit 126 more in detail. As shown in FIG. 5, the packet level discard control unit 126 comprises a packet level discard control table 129 in which there is accumulated control information for packet level discard 11 of every connection, an upstream congestion detection circuit 127 for extracting a congestion state of an ATM switch provided in the upstream from the cell within the cell buffer 122 thereby to report upstream congestion information 12 to the packet level discard judgment circuit 131, a connection entry number detection unit 128 for extracting a connection entry number 615 (will be described later on) from the cell within the cell buffer 122 thereby to report the extracted value to the packet level discard control table 129, a packet end cell detection unit 130 for extracting a packet end cell indication bit 614 (will be described later on) from the cell within the cell buffer 122 thereby to report the extracted value to the packet level discard judgment circuit 131, and a packet level discard judgment circuit 131 for determining based on the control information for packet level discard 11 of the packet level discard control table 129, the upstream congestion information 12 and output FIFO buffer congestion information 13 detected by the congestion detection circuit 125 whether or not the packet level discard should be executed.

The packet level discard judgment circuit 131 for determining based on the control information for packet level discard 11, the upstream congestion information 12 and the output FIFO buffer memory congestion information 13 whether or not the packet level discard should be executed and the upstream congestion detection circuit 127 within the packet level discard control unit 126 are the intrinsic elements of the present invention. The ATM switches A 201 and C 203 are the same as the ATM switch B 202 excepting that the packet level discard control unit 126 does not exist, the output FIFO buffer memory congestion information 13 does not exist between the congestion detection circuit 125 and the packet level discard control circuit 126 and a signal does not exist between the cell buffer 122 and the packet level discard control unit 126.

Figure 6A:
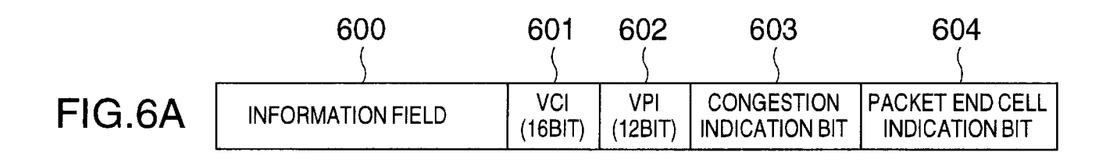
FIG. 6A is a cell format within an ATM network.
Figure 6B:
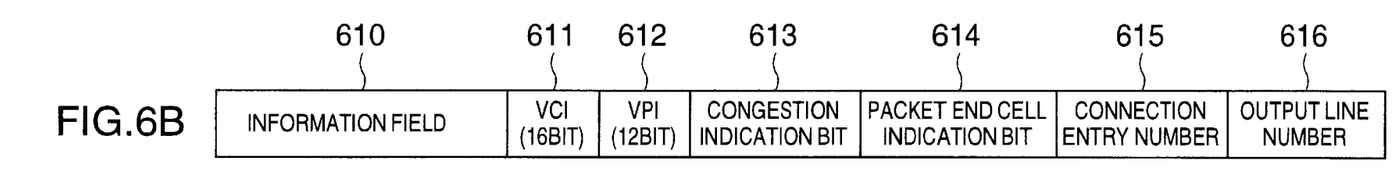
FIG. 6B is a cell format (internal cell format) within a switch core unit of an ATM switch.

FIG. 6A shows a cell format within the ATM network, and FIG. 6B shows a cell format (hereinafter referred to as "internal cell format") within the switch core unit 120 of the ATM switches A 201, B 202, C 203. As shown in FIG. 6A, the cell format within the ATM network comprises an information field 600, connection indications VCI601/VPI602, a congestion indication bit 603 and a packet end cell indication bit 604. As shown in FIG. 6B, the internal cell format comprises an information field 610, connection indications VCI611/VPI612, a congestion indication bit 613, a packet end cell indication bit 614, a connection entry number 615 which is a table number of the packet level discard control table 129 and an output line number 616.

The embodiment of the present invention will be described below in which an operation of the present invention is separated into two types of operations so as to facilitate the understanding of the present invention. Two types of operations will be referred to as "operation 1" and "operation 2".

The operation 1 is such that the ATM switch A 201 or the ATM switch C 203 writes its own congestion state in the cell thereby to report the congestion state to the ATM switch B 202. The operation 2 is such that the ATM switch B 202 judges based on the congestion indication bit 603 within the cell transmitted from the ATM switch A 201 or the ATM switch C 203, whether or not the cells sent from the end system A 211 to the end system D 214 should be discarded.

Initially, the operation 1 will be described with reference to the connection 21. The end system A 211 turns the congestion indication bit 603 OFF, and transmits a cell to the ATM switch A 201. When the cell is received by the ATM switch A 201 from the input line 1, information corresponding to the VCI601/VPI602 of the cell is read out from the header conversion table 111-1, and VCI601/VPI602 of the cell is converted into VCI611/VPI612, and the cell is further added with the connection entry number 615 and the output line number 616 and thereby converted into the internal cell format. Moreover, the information field 600, the congestion indication bit 603 and the packet end cell indication bit 604 are not changed in content and retained as an information field 610, a congestion indication bit 613 and a packet end cell indication bit 614, respectively. Cells inputted from the input lines i (i=1 to N) are multiplexed by the multiplexer 121 and transmitted to the cell buffer 122. The output line number 616 of the cell within the connection 21 becomes "N". The VCI611/VPI612 is maintained as it is when it is outputted from the output line N, and used as the connection indication when the cell is switched from the input line 2 to the output line N in the ATM switch B 202.

The congestion detection circuit 125 turns the congestion indication bit 613 within the cell of the cell buffer 122 ON when a value C-N of the cell counter 124-N of the output FIFO buffer memory 123-N corresponding to the output line number 616 and the congestion judgment threshold value T1 within the congestion detection circuit 125 satisfy a relationship of T1<C-N. Thereafter, the cell within the cell buffer 122 is transmitted to the output FIFO buffer memory 123-N corresponding to the output line number 616.

When cell input rates of the connections 21 and 22 shown in FIG. 2 exceed an output rate of the output line N, cells are accumulated in the output FIFO buffer memory 123-N.

When a cell is tried to be transmitted to the output FIFO buffer memory 123-N, if cells of the maximum cell number T2 that can be accumulated are accumulated in the output FIFO buffer memory 123-N, then the cell is discarded within the cell buffer 122. When the cell is inputted to the output FIFO buffer memory 123-N, the cell counter 124-N increments its count value C-N by "1". When cells of the number larger than T1 are accumulated in the output FIFO buffer memory 123-N, the cell of which the congestion indication bit 613 is turned ON by the congestion detection circuit 125 is inputted to the output FIFO buffer memory 123-N. The cells accumulated in the output FIFO buffer memory 123-N are transmitted to the output line interface unit N 130-N in the same sequential order as that in which the cells are accumulated in the output FIFO buffer memory 123-N. Each time a cell is transmitted, the cell counter 124-N decrements its count value C-N by "1". In the output line interface unit N 130-N, the connection entry number 615 and the output line number 616 are deleted by the header deletion unit 131-N, and the cell is outputted through the physical layer initiation unit 132-N from the output line N.

Incidentally, there is a large possibility that the packet which does not contain the cell in which the congestion indication bit 613 is ON is transmitted from the ATM switch A 201 as the perfect packet. On the other hand, there is a large possibility that the packet which contains the cell in which the congestion indication bit 613 is ON will be transmitted from the ATM switch A 201 as the cell-missing-packet. Cells in the connections 22, 23, 24 are transferred to the ATM switch B 202 similarly to the cell in the connection 21.

Next, the (operation 2) will be described with reference to the case in which the cell within the connection 21 is switched from the input line 2 to the output line N by the ATM switch B 202.

The Cell is inputted from the input line 2 and accumulated in the cell buffer 122 through the input line interface unit 2 110-2. Further, based on the congestion state of the output FIFO buffer memory 123-N, the congestion indication bit 613 within the cell is turned ON. These procedures are similar to those of the above-mentioned (operation 1). Congestion information sent from the ATM switch B 202 is not used in the present invention but it is used by the congestion control in the ABR traffic.

Initially, an operation of the packet level discard control unit 126 will be described. The upstream congestion detection circuit 127 extracts the congestion indication bit 613 from the cell within the cell buffer 122 and reports the thus extracted congestion indication bit 613 to the packet level discard judgment circuit 131 as the upstream congestion information 12.

The congestion detection circuit 125 compares a count values C-i (i=1 to N) of the output FIFO buffer memories 123-i (i=1 to N) corresponding to the output line number 616 and the threshold values T3, T4 (T3<T4) within the congestion detection circuit 125 and reports a compared result to the packet level discard judgment circuit 131 as the output FIFO buffer memory congestion information 13. The output FIFO buffer memory congestion information 13 is 2-bit information, and becomes "00" when C-i≦T3 (normal state). The output FIFO buffer memory congestion information 13 becomes "01" when T3<C-i≦T4 (slight congestion state). The output FIFO buffer memory congestion information 13 becomes "10" when T4<C-i (serious congestion state).

Figure 7:
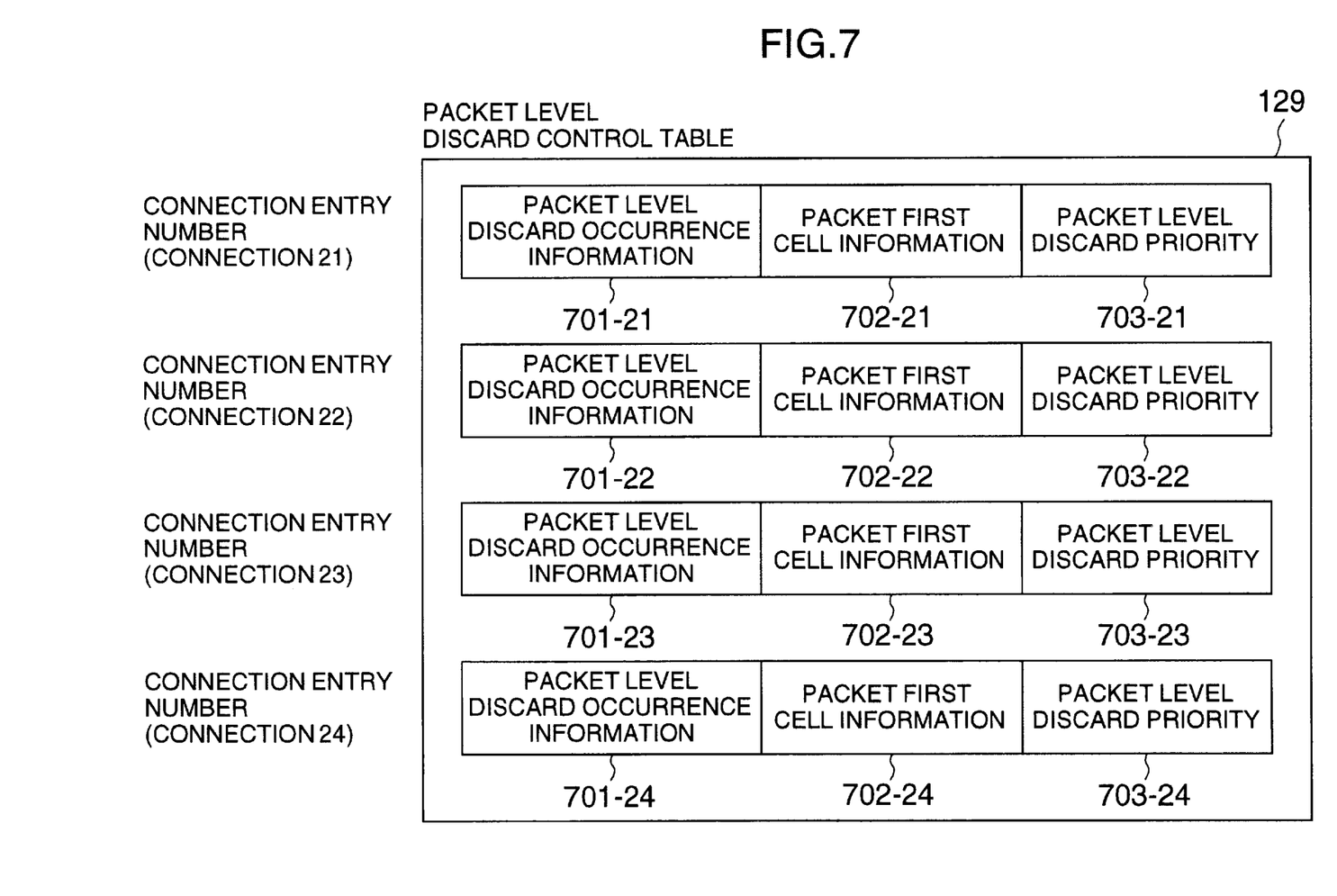
FIG. 7 is a table format of a packet level discard control table 129.

The connection entry number detection unit 128 extracts the connection entry number 615 from the cell within the cell buffer 122 and reports the value of the extracted connection entry number 615 to the packet level discard control table 129. In response to the value reported thereto, the packet level discard control table 129 reports the control information for packet level discard 11 corresponding to the connection entry number 615 to the packet level discard judgment circuit 131. FIG. 7 shows a table format of the packet level discard control table 129. As shown in FIG. 7, the packet level discard control table 129 comprises packet level discard occurrence information 701-21 to 701-24 indicative of the occurrence of the packet level discard, packet first cell information 702-21 to 702-24 and packet level discard priorities 703-21 to 703-24 which determine whether or not the packet level discard control should be executed based on the upstream congestion information 12. The control information for packet level discard 11 corresponding to the connection entry number 615 of connections 2j (j=1 to 4) contains packet level discard occurrence information 701-2j, packet first cell information 702-2j and packet level discard priorities 703-2j. Since the four connections 21, 22, 23, 24 are set in the ATM switch B 202 as described above, if n connections are set in the ATM switch B 202, then there may be used n entries.

If any one of ATM switches not having the packet level discard function exists on the path of the upstream of the ATM switch B 202 of the connections 2j, then when the connections are set, the packet level discard priorities 703-2j are turned ON. In the case of FIG. 2 of this embodiment, the packet level discard priorities 703-2j corresponding to the connections 21, 22, 23, 24 are previously set to ON.

The packet first cell information 702-2j are set to ON when the connections are set. Thus, when the ATM switch B 202 first receives a first cell within the connections 2j after the connections 2j were set, the packet level discard occurrence information 702-2j corresponding to the connection entry number 615 are turned ON. When cells (cells in which the packet end cell indication bit 614 is OFF) other than the packet end cell are outputted from the cell buffer 122 or discarded within the cell buffer 122, the packet first cell information 702-2j corresponding to the connection entry number 615 are turned OFF. Also, when the packet end cell (cell in which the packet end cell indication bit 614 is ON) is outputted from the output buffer 122 or discarded within the cell buffer 122, the packet first cell information 702-2j corresponding to the connection entry number 615 of the connection 2j is turned ON.

According to this operation, it is possible to confirm based on the packet first cell information 702-2j whether or not the cell of the connection 2j within the cell buffer 122 is the packet first cell.

The packet level discard occurrence information 701-2j is set to OFF upon initialization. Thus, after initialization, when the ATM switch B 202 first receives the cell within the connection 2j, the packet level discard occurrence information 701-2j corresponding to the connection entry number 615 is set to OFF. When the packet first cell within the connection 2j is inputted, if it is determined that the packet containing the packet first cell is a discard target, then the packet level discard occurrence information 701-2j is turned ON. When a packet middle cell (i.e. cell which is neither the packet first cell nor the packet end cell) is inputted, the value of the packet level discard occurrence information 701-2j corresponding to the connection entry number 615 is maintained as it. When the packet end cell (cell in which the packet end cell indication bit 614 is ON) is inputted, if the packet level discard occurrence information 701-2j corresponding to the connection entry number 615 is set to OFF, then when the packet first cell is inputted, the packet level discard occurrence information 701-2*j* is constantly held at the OFF state.

Figure 9:
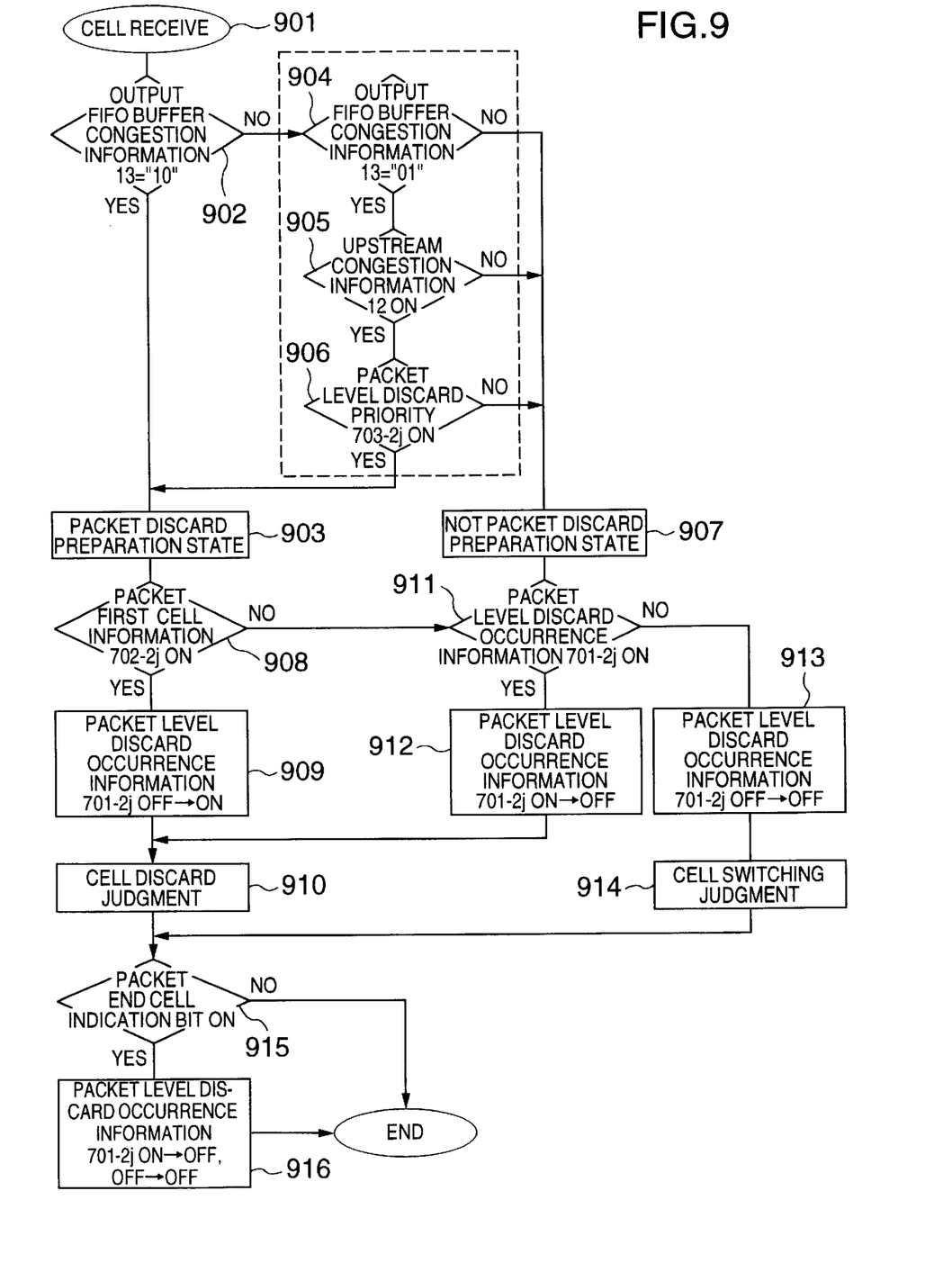
FIG. 9 is a flowchart used to explain the manner in which a packet level discard judgment circuit 131 executes a cell discard judgment.

FIG. 9 shows a cell discard judgment flowchart based on the packet level discard executed by the packet level discard judgment circuit 131. The packet level discard judgment circuit 131 judges a packet discard preparation state of every cell based on the packet level discard priority 703-2*j* within the control information for packet level discard 11, the upstream congestion information 12 and the output FIFO buffer memory congestion information 13.

Referring to FIG. 9, when a cell is received by the cell buffer 122 at a step 901, it is determined at the next decision step 902 whether or not the output FIFO buffer memory congestion information 13 is "10" (i.e. serious congestion state). If the output FIFO buffer memory congestion information 13 indicates the serious congestion state as represented by a YES at the decision step 902, then control goes to a step 903, whereat it is determined that the state is the packet discard preparation state. If the output FIFO buffer memory congestion information 13 indicates the state other than the serious congestion state as represented by a NO at the decision step 902, then control goes to the next decision step 904, whereat it is determined whether or not the output FIFO buffer memory congestion information 13 is "01" (slight congestion state). If the output FIFO buffer memory congestion information 13 is "01" as represented by a YES at the decision step 904, then control goes to the next decision step 905, whereat it is determined whether or not the upstream congestion information 12 is ON. If the upstream congestion information 12 is ON as represented by a YES at the decision step 905, then control goes to the next decision step 906, whereat it is determined whether or not the packet level discard priority 703-2*j* is ON. If the output FIFO buffer memory congestion information 13 indicates the slight congestion state at the decision step 904 and the upstream congestion information 12 and the packet level discard priority 703-2*j* are both ON at the decision steps 905 and 906, then control goes to the step 903, whereat it is determined that the state is the packet discard preparation state. In other cases, control goes to a step 907, whereat it is determined that the state is not the packet discard preparation state.

Based on the result of judging whether or not the state is the packet discard preparation state and the packet level discard information 701-2*j* and the packet first cell information 702-2*j* within the control information for packet level discard 11, it is determined whether the cell received by the cell buffer 122 at the step 901 is discarded or outputted to the output FIFO buffer memory.

If the state is the packet discard preparation state at the step 903, then control goes to the next decision step 908, whereat it is determined by the packet level discard judgment circuit 131 whether or not the packet first cell information 702-2*j* is ON. If the packet first cell information 702-2*j* is ON as represented by a YES at the decision step 908, then control goes to a step 909, whereat the packet level discard occurrence information 701-2*j* corresponding to the connection entry number 615 is set to ON in order to discard all cells composing the packet containing the packet first cell. Also, control goes to a step 910, whereat it is determined that cells within the cell buffer 122 should be discarded. Then, it is reported to the cell buffer 122 such that the cell buffer 122 may not send cells to the output FIFO buffer memory 123-i (i=1 to N) but the cell buffer 122 may discard cells.

If it is determined at the step 907 that the state is not the packet discard preparation state and also the packet first cell information 702-2*j* is not ON, then control goes to the next decision step 911 whether or not the packet level discard occurrence information 701-2*j* is ON. If the packet level discard occurrence information 701-2*j* is ON as represented by a YES at the decision step 911, then the packet level discard judgment circuit 131 judges at the step 910 that the cells within the buffer cell 122 should be "discarded", and it is reported to the cell buffer 122 such that the cell buffer 122 may not send cells to the output FIFO buffer memory 123-i but the cell buffer 122 may discard the cells. In 10 that case, the packet level discard occurrence information 701-2*j* is not changed but maintained at the ON level at a step 912, and other cells composing the same packet are discarded.

If it is determined by the packet level discard judgment circuit 131 at the decision step 911 that the packet level discard occurrence information 701-2*j* is not ON, then it is determined at a step 914 that the cell within the cell buffer 122 is "switching", and it is reported to the cell buffer 122 such that the cell buffer 122 sends the cell to the output FIFO buffer memory 123-i. In that case, the packet level discard occurrence information 701-2*j* is not changed and held at the OFF state at a step 913, and other cells composing the same packet are switched.

Finally, it is determined at a decision step 915 whether or not the packet end cell indication bit 614 is ON. If the packet end cell indication bit 614 is ON as represented by a YES at the decision step 915, then control goes to a step 916, whereat the packet level discard occurrence information 701-2*j* corresponding to the connection entry number 615 is set to OFF. If the packet end cell indication bit 614 is not ON as represented by a NO at the decision step 915, then control is ended.

In the above-mentioned cell discard judgment flowchart shown in FIG. 9, only when the packet first cell is inputted to the cell buffer 122 and it is determined that the state is the packet discard preparation state, the packet level discard occurrence information 701-2*j* within the packet level discard control table 129 corresponding to the connection entry number 615 within the packet first cell is set ON at the step 909. Also, when the cell inputted to the cell buffer 122 is other than the packet first cell, the packet level discard occurrence information 701-2*j* is maintained as it is at the steps 912 and 913. Only after the packet end cell is judged as "discard", the packet level discard occurrence information 701-2*j* within the packet level discard control table 129 is rewritten from ON to OFF. Accordingly, in the above-mentioned cell discard judgment flowchart shown in FIG. 9, all cells composing one packet can be discarded or switched, and hence the packet level discard can be executed.

The cell transmitted to the output FIFO buffer memory 123-N is outputted from the output line N by the procedures similar to those of the above-mentioned operation 1).

In the ATM network shown in FIG. 2, since the TM switch A 201 is in the congestion state, the congestion indication bit 603 of the cells on the connections 21 and 22 is made ON, and the cells on the connections 21 and 22 are inputted to the ATM switch B 202. Also, since the ATM switch C 203 is not in the congestion state, the congestion indication bit 603 of the cells on the connection 23 and 24 is held at the OFF state, and the cells on the connections 23 and 24 are inputted to the ATM switch B 202. In the ATM switch B 202, the upstream congestion detection circuit 127 extracts the congestion indication bit 603 from the cell inputted to the cell buffer 122 and reports the extracted congestion indication bit 603 to the packet level discard judgment circuit 131 as the upstream congestion information 12. Since the packet level discard judgment circuit 131 determines based on the upstream congestion information 12 whether or not the state is the packet discard preparation state (step 905 in FIG. 9), the ATM switch B 202 can packet-level-discard respective cells on the connections 21, 22 through the congested ATM switch A 201 with a priority to the cells on other connections 23, 24.

The ATM network shown in FIG. 2 has been described so far by way of example. Let us now describe the case (case 2) of the ATM network shown in FIG. 3. The ATM network shown in FIG. 3 is similar to the ATM network shown in FIG. 2 excepting that the ATM switch C 203 not having the packet level discard function shown in FIG. 2 is replaced with the ATM switch D 204 having the packet level discard function. Connections 21, 22, 23, 24 also are set similarly to FIG. 2, and there exist four connections 21, 22, 23, 24 in which the end systems A 211, B 212, C 213 and D 214 transmit cells to the end system E 215. The above-mentioned (operation 1) is executed in all of the ATM switches A 201, B 202, C 203 and D 204, and the above-mentioned (operation 2) is executed only in the ATM switch B 202 having the packet level discard function.

The ATM switch B 202 shown in FIG. 2 and the ATM switch B 202 shown in FIG. 3 differ from each other in the initialization of the packet level discard priority 703-2j within the packet level discard control table 129. Specifically, in the ATM network shown in FIG. 2, since the switch A 201 not having the packet level discard function exists in the upstream of the connections 21, 22 and the switch C 203 not having the packet level discard function exists in the upstream of the connections 23, 24, in the ATM switch B 202 shown in FIG. 2, when the respective connections 21, 22, 23, 24 are set, all packet level discard priorities 703-2j within the packet level discard control table 129 are set to ON. On the other hand, in the ATM network shown in FIG. 3, since the switch A 201 not having the packet level discard function exists in only the upstream of the connections 21, 22, in the ATM switch B 202 shown in FIG. 3, when the respective connections 21, 22, 23, 24 are set, only the packet level discard priorities 703-21 and 703-22 within the packet level discard control table 129 are set to ON, and the packet level discard priorities 703-23 and 703-24 are still maintained to be OFF.

The ATM switch B 202 shown in FIG. 3 also executes the packet level discard in accordance with the cell discard judgment flowchart shown in FIG. 9. Since it is determined by the packet level discard judgment circuit 131 based on the packet level discard priority 703-2j whether or not the state is the packet level discard preparation state (step 906 in FIG. 9), the ATM switch B 202 in FIG. 3 is able to packet-level-discard cells on the connections 21, 22 through the ATM switch A 201 not having the packet level discard function with a priority to cells on other connections 23, 24.

According to the present invention, since the ATM switch having the packet level discard function discards packets from other ATM switches which are in the congestion state and packets from other ATM switches not having the packet level discard function with a priority to packets from other ATM switches which are not in the congestion state and packets from other ATM switches having the packet level discard function, the transmission of the cell-missing-packets to the ATM network can be minimized, and hence the bandwidth of the ATM network can be used effectively.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An asynchronous transmission mode switch comprising:
   a plurality of input line interface units provided at every plurality of input lines;
   a plurality of output line interface units provided at every plurality of output lines; and
   a switch core unit connected to said plurality of input line interface units and said plurality of output line interface units for switching cells inputted from said input line interface units to any one of said output line interface units or packet-level-discarding said cells, wherein said switch core unit includes a packet level discard control table for holding at every connection a packet level discard priority indicating whether or not other ATM switches not having a packet level discard function exist in the upstream of connections, and discards cells from ATM switches not having the packet level discard function prior to other cells, and wherein said switch core unit further includes a first congestion detection circuit for detecting a congestion state within said switch core unit and only when the detected result of said first congestion detection circuit indicates a predetermined congestion state, cells from other ATM switches having said packet level discard function not implemented are discarded with a priority to other cells, and wherein said switch core unit further includes a second congestion detection circuit for detecting a congestion state of other ATM switch through which said cell is transmitted based on a congestion indication bit within said cell and only when a detected result of said first congestion detection circuit indicates said predetermined congestion state, of the cells which are judged to be transmitted via other congested ATM switch by the second congestion detection circuit, cells transmitted via other ATM switch not having the packet level discard function are packet-level-discarded with said priority to other cells.

2. An ATM switch as claimed in claim 1, wherein said switch core unit further includes a congestion detection circuit for detecting a congestion state of said switch core unit and when a detected result of said congestion detection circuit indicates a serious congestion, all cells are packet-level-discarded, and when said detected result of said congestion detection circuit indicates a slight congestion, cells transmitted via other ATM switches not having said packet level discard function are packet-level-discarded with said priority to other cells.

3. An ATM switch comprising:
   a plurality of input line interface units provided at every plurality of input lines;
   a plurality of output line interface units provided at every plurality of output lines; and
   a switch core unit connected to said plurality of input line interface units and said plurality of output line interface units for outputting cells inputted from said input line interface units to any one of said output line interface units on output line numbers within said cells, wherein said switch core unit includes a packet level discard control table for holding at every connection a packet level discard priority indicating whether or not other ATM switches not having said packet level discard function exist in the upstream of connections, and discards cells from ATM switches not having the packet level discard function prior to other cells, and wherein said switch core unit further includes a first congestion detection circuit for detecting a congestion state of said switch core unit and only when the detected result of said first congestion detection circuit indicates a predetermined congestion state, cells from other ATM switches having said packet level discard function not implemented are discarded with a priority to other cells, and wherein said switch core unit further includes a second congestion detection circuit for detecting a congestion state of other ATM switch through which said cell is transmitted based on a congestion indication bit within said cell and only when a detected result of said first congestion detection circuit indicates said predetermined congestion state, of the cells which are judged to be transmitted via other congested ATM switch by the second congestion detection circuit, cells transmitted via other ATM switch not having the packet level discard function are packet-level-discarded with said priority to other cells.

4. An ATM switch as claimed in claim 3, wherein said switch core unit further includes a congestion detection circuit for detecting a congestion state of said switch core unit and when a detected result of said congestion detection circuit indicates a serious congestion, all cells are packet-level-discarded, and when said detected result of said congestion detection circuit indicates a slight congestion, cells transmitted via other ATM switches not having said packet level discard function are packet-level-discarded with said priority to other cells.

5. An ATM switch having a packet level discard function implemented comprising:

a plurality of input line interface units provided at every plurality of input lines;

a plurality of output line interface units provided at every plurality of output lines; and a switch core unit connected to said plurality of input line interface units and said plurality of output line interface units for switching cells inputted from said input line interface units to any one of said output line interface units or packet-level-discarding said cells, wherein said switch core unit includes a first congestion detection circuit for detecting a congestion state of other ATM switch based on a congestion indication bit within a cell transmitted through the other ATM switch and discards based on a detection result of said first congestion detection circuit cells transmitted via other congested ATM switches with a priority to cells transmitted via other ATM switches which are not congested, and wherein said switch core unit further includes a second congestion detection circuit for detecting a congestion state within said switch core unit and when a detected result of said second congestion detection circuit indicates a serious congestion, all cells are packet-level-discarded, and when said detected result of said second congestion detection circuit indicates a slight congestion, cells transmitted via other ATM switches which are in the congestion state are packet-level-discarded with said priority to cells transmitted via other ATM switches which are not in the congestion state.

6. An ATM switch having a packet level discard function implemented comprising:

a plurality of input line interface units provided at every plurality of input lines;

a plurality of output line interface units provided at every plurality of output lines; and a switch core unit connected to said plurality of input line interface units and said plurality of output line interface units for outputting cells inputted from said input line interface units to any one of said output line interface units on an output line number within said cell, wherein said switch core unit includes a first congestion detection circuit for detecting a congestion state of other ATM switch based on a congestion indication bit within a cell transmitted through the other ATM switch and discards based on a detection result of said first congestion detection circuit cells transmitted via other congested ATM switches with a priority to cells transmitted via other ATM switches which are not congested, and wherein said switch core unit further includes a second congestion detection circuit for detecting a congestion state within said switch core unit and only when the detected result of said second congestion detection circuit indicates a predetermined congestion state, cells transmitted via other ATM switches which are in the congestion state are packet-level-discarded with a priority to cells transmitted via other ATM switches which are not in the congestion state.

7. An ATM switch having a packet level discard function implemented comprising:

a plurality of input line interface units provided at every plurality of input lines;

a plurality of output line interface units provided at every plurality of output lines; and a switch core unit connected to said plurality of input line interface units and said plurality of output line interface units for outputting cells inputted from said input line interface units to any one of said output line interface units on an output line number within said cell, wherein said switch core unit includes a first congestion detection circuit for detecting a congestion state of other ATM switch based on a congestion indication bit within a cell transmitted through the other ATM switch and discards based on a detection result of said first congestion detection circuit cells transmitted via other congested ATM switches with a priority to cells transmitted via other ATM switches which are not congested, and wherein said switch core unit further includes a second congestion detection circuit for detecting a congestion state within said switch core unit and when a detected result of said second congestion detection circuit indicates a serious congestion, all cells are packet-level-discarded, and when said detected result of said second congestion detection circuit indicates a slight congestion, cells transmitted via other ATM switches which are in the congestion state are packet-level-discarded with said priority to cells transmitted via other ATM switches which are not in the congestion state.

* * * * *